United States Patent
Colon (10) Patent No.: US 7,510,356 B2
(45) Date of Patent: Mar. 31, 2009

(54) DRILL BIT AND DUST COLLECTOR ATTACHMENT FOR DRILLS

(75) Inventor: Julio A. Colon, New York, NY (US)

(73) Assignee: CGP LLC, Easton, MD (US)

( * ) Notice: Subject to any disclaimer, the term of this patent is extended or adjusted under 35 U.S.C. 154(b) by 1 day.

(21) Appl. No.: 11/807,287

(22) Filed: May 25, 2007

(65) Prior Publication Data

US 2007/0292222 A1    Dec. 20, 2007

Related U.S. Application Data

(60) Provisional application No. 60/809,012, filed on May 26, 2006.

(51) Int. Cl.
*B23B 47/34* (2006.01)
(52) U.S. Cl. .......................... 408/1 R; 408/67
(58) Field of Classification Search .......... 408/1 R, 408/1 BD, 67; 409/134, 137; *B23B 47/34*
See application file for complete search history.

(56) References Cited

U.S. PATENT DOCUMENTS

| | | | |
|---|---|---|---|
| 1,990,991 A * | 2/1935 | Heubach | 409/137 |
| 3,850,254 A * | 11/1974 | Hirdes | 173/75 |
| 3,946,818 A * | 3/1976 | Ek | 175/209 |
| 3,965,998 A | 6/1976 | Gyongyosi et al. | |
| 4,100,982 A | 7/1978 | Wilkinson et al. | |
| 4,646,853 A | 3/1987 | Sugden et al. | |
| 4,848,980 A | 7/1989 | Broussard | |
| 4,921,375 A * | 5/1990 | Famulari | 408/67 |
| 5,090,499 A | 2/1992 | Cunao | |
| 5,113,951 A * | 5/1992 | Houben et al. | 173/75 |
| 5,419,663 A | 5/1995 | Psomas | |
| 5,497,841 A | 3/1996 | Cox et al. | |
| 5,772,367 A * | 6/1998 | Daniel | 408/67 |
| 5,980,446 A | 11/1999 | Loomis et al. | |

(Continued)

FOREIGN PATENT DOCUMENTS

DE    4445103 A1 *    5/1996

(Continued)

OTHER PUBLICATIONS www.shop.com listing for "Straight Shank Hammer Drill Bit" printed on Mar. 28, 2006.

(Continued)

*Primary Examiner*—David P Bryant
*Assistant Examiner*—Eric A. Gates
(74) *Attorney, Agent, or Firm*—Onofrio Law; Dara L. Onofrio, Esq.

(57) ABSTRACT

A drill bit made of a shaft including a fan on the shaft having at least one blade; and related drill attachment for dust and debris collection made of a handle; a housing body having a front and back portion and a top and bottom portion, such that the bottom portion is connected to the handle and the housing body contains a hollow opening perpendicular to the handle; a nozzle which is connected to the front portion of the housing body; a drill bit comprising a shaft including a fan on the shaft having at least one blade within said hollow circular opening; and a receptacle to collect dust and debris while the drill is in use.

18 Claims, 7 Drawing Sheets

U.S. PATENT DOCUMENTS

| | | | |
|---|---|---|---|
| 6,053,674 | A | 4/2000 | Thompson |
| 6,095,724 | A | 8/2000 | Hurt |
| 6,102,631 | A | 8/2000 | Nyari |
| 6,146,066 | A * | 11/2000 | Yelton ........................ 409/134 |
| 6,193,448 | B1 | 2/2001 | Brennan |
| 6,379,091 | B1 | 4/2002 | Queipo |
| 6,557,261 | B1 | 5/2003 | Buser et al. |
| 6,851,900 | B2 | 2/2005 | Tillemans et al. |
| 2002/0154960 | A1* | 10/2002 | Lin ............................. 408/67 |
| 2004/0192184 | A1 | 9/2004 | Staas et al. |

FOREIGN PATENT DOCUMENTS

| | | | |
|---|---|---|---|
| DE | 10248526 A1 | * | 4/2004 |
| GB | 2309660 A | * | 8/1997 |
| JP | 10217065 A | * | 8/1998 |
| JP | 2000061770 A | * | 2/2000 |

OTHER PUBLICATIONS www.store.yahoo.com/tylertool listing for "Tyler Tool Company" printed on Mar. 28, 2006.

www.csunitec.com/mason/masonrytools listing for Dust Extraction Power Tools and Vacumm System Heavy Duty for Construction and Industry printed on Mar. 28, 2006.

* cited by examiner

DRILL BIT AND DUST COLLECTOR ATTACHMENT FOR DRILLS

This application claims the benefit of U.S. provisional application No. 60/809,012 filed May 26, 2006, which is incorporated herein in its entirety by reference.

FIELD OF THE INVENTION

The present invention relates to an attachment for drills, preferably electric drills, which collects dust and debris. More specifically, it relates to a drill bit including a fan blade to direct the dust particles to a receptacle for collection.

BACKGROUND OF THE INVENTION

The general disclosure of various tools which collect dust particles are known in the prior art. Representative patents include U.S. Pat. No. 6,851,900 B2 to Tillemans et al.; U.S. Pat. No. 6,557,261 B1 to Buser et al.; U.S. Pat. No. 6,379,091 B1 to Queipo; U.S. Pat. No. 6,095,724 to Hurt; U.S. Pat. No. 6,053,674 to Thompson; U.S. Pat. No. 5,980,446 to Loomis et al.; U.S. Pat. No. 5,497,841 to Cox et al.; U.S. Pat. No. 4,646,853 to Sugden et al.; U.S. Pat. No. 4,100,982 to Wilkinson et al.; and U.S. Pat. No. 3,965,998 to Gyongyosi et al.

Drill devices for capturing dust particles are also in general known in the prior art and include U.S. Pat. No. 6,193,448 B1 to Brennan; U.S. Pat. No. 6,102,631 to Nyari; U.S. Pat. No. 5,090,499 to Cuneo; U.S. Pat. No. 5,419,663 to Psomas and U.S. Patent Application Publication No. 2002/0154960 to Lin.

U.S. Pat. No. 4,848,980 to Broussard discloses a corrugated rubber device which provides a snug fit on the drilling end of an electric drill. This rubber device has recoil capabilities to accommodate the penetration of the drill bit as it progresses into the drilling surface. The dust and debris are collected in a small holding area near the tip of the rubber device. When the user removes the drill after use the dust and debris can very easily spill out from this holding area.

U.S. Patent Application Publication No. 2004/0192184 A1 to Staas et al. discloses a dust extraction shroud for a drill. The Staas et al. device provides a second inlet of air remote from the surface being drilled to aid in the prevention of the inlets becoming blocked with dust.

Advantage of the present invention over known devices is in the provision of a drill bit which is made of a shaft including a fan affixed thereon having at least one blade, and preferably up to six blades Further advantage of the invention, is the inclusion of this drill bit within a drill attachment device for dust and debris collection which is cleaner and more efficient than known devices. In addition to the drill bit including a fan, the drill attachment includes a handle, a housing body, a nozzle and a receptacle to collect the dust and debris while the drill is in use.

The nozzle portion of the device has an opening at the tip and is lined with a rubber cushion (or similar material) which when placed on the drilling surface creates a tight fit on the surface. When the drill bit penetrates the drilling surface dust produced is driven by at least one fan blade back into a dust and debris receptacle on the handle. None of the known devices provides this particular structure.

The drill bit and drill attachment enables the user to drill any surface "dust-free". The specific structure of the drill includes a rubber cushion or similar material at the tip of the attachment nozzle which when placed on the drilling surface creates a tight fit on the surface. When drilling begins the dust is collected in a dust and debris receptacle without dispersing within the room or area.

The invention is used to collect plaster, wood, brick, concrete, metal shavings and filings, dust and debris when drilling holes into these surfaces, thereby protecting the eyes, lungs and face while avoiding the "mess" of furnishings when performing repairs/alterations to offices, homes and the like.

Once drilling begins, dust and debris is propelled by the drill bit including a fan having at least one blade into the dust collection receptacle that is inside the handle portion of the device. The dust collection receptacle is preferably disposable and detaches for easy emptying and cleaning of the dust and debris.

The drill and attachment are separate structures. This keeps the drill clean and free of dust and debris and thus won't clog and ruin the electric drill.

A general objective of the invention is to provide a drill attachment to collect dust and debris while drilling.

Another objective of the invention is to provide a dust-free drilling method. Another objective of the invention is to provide a drill attachment for collection of plaster, wood, brick, concrete, dust and debris when drilling holes into these surfaces.

A further object of the invention is to protect the eyes, lungs and face while avoiding the "mess" of furnishings when performing repairs/alterations to offices, homes and the like.

Yet a further object of the invention is to provide conventional drill bit sizes and shapes with an integral fan structure for use in the invention device enabling the user to drill in any type of surface including concrete, plaster, metal and wood, while collecting dust and debris.

SUMMARY OF THE INVENTION

In the present invention, these purposes, as well as others which will be apparent, are achieved generally by providing a drill attachment for dust and debris collection including a handle; a housing body connected to the handle, wherein the housing contains a hollow opening perpendicular to the handle running completely through the body; a nozzle connected to the front portion of the housing body; a drill bit and a receptacle to collect dust and debris while the drill is in use.

The drill bit is within the hollow opening of the housing body and is made of a shaft including a fan on the shaft having at least one blade. The fan on the drill bit is preferably made of metal, but can also be made of rubber or plastic material and has six blades. The fan is preferably situated in the front portion of the housing body connected to the nozzle. A removable access piece on the front portion of the housing body adjacent to the nozzle provides the user easy access to place different drill bits within the device for use. In an alternate embodiment the housing body is one integral structure with the nozzle being easily removable from the housing body to place the drill bit within the device.

An additional shaft is located within the hollow opening of the housing body. One side of the additional shaft has a chuck for attaching and securing the drill bit and the opposite side of the additional shaft has means for attachment to a drill. Preferably, the device further includes a locking mechanism within the housing body to hold the additional shaft securely in place and mostly to prevent it from sliding forward or backward during use.

The receptacle is preferably located within the handle of the attachment. It detaches easily for emptying and cleaning. In preferred embodiments, the receptacle includes a filter, between the housing body and handle, for collecting the dust and debris produced while drilling.

The components of the invention are easily separated for use and cleaning. The handle, housing body, nozzle and receptacle are preferably made of molded plastic. However, they may be made from materials selected from the group consisting of plastic, rubber, metal or other like materials may also be used.

At the tip of the nozzle, on the side opposite connection to the housing body, is an aperture. The outermost surface of the aperture is lined with a material, such as rubber, to hold the attachment in place on a surface. The aperture is wide enough, so that the suction created during use, is enough to collect the dust and debris from the surface being drilled. The structure of the nozzle provides a snug fit against the object to be drilled and enables capture of the dust and debris.

The drill bits used in the invention are interchangeable and correspond to conventional size and shape drill bits, but differ in the inclusion of an integral fan affixed to the drill bit shaft. The drill bit used depends on the surface to be drilled. The nozzle is constructed to expand and contract as needed while the drill bit is in use. The length of the nozzle is varied depending on the size of the drill bit being used. In a preferred embodiment the nozzle further includes a spring mechanism to accomplish this, and in another embodiment the nozzle is of a telescopic design which can be adjusted to the desired length. The aperture of the nozzle can also be adjusted depending on the drill bit used and the surface being drilled.

In a preferred embodiment, the device includes a second fan contained within the center portion of the housing body. When the device is in use, this second fan provides additional force and suction to direct the dust and debris downward into the collection receptacle.

The invention also provides a method for drilling and collecting dust and debris by attaching the drill attachment according to the invention to a drill, preferably and electric drill. The nozzle of the housing body is placed on the surface to be drilled. Once drilling commences the drill bit penetrates the surface and the dust and debris produced is directed by the fan into the attachment and collected within the receptacle.

Both the fan on the drill bit and the second fan are operated when the device is connected to a drill. When the drill is in use, the additional shaft is attached to the chuck of the drill, while the drill bit is secured to the chuck within the housing body on the opposite side of the additional shaft. Upon operation of the drill the entire additional shaft and attached drill bit rotates while penetrating the surface being drilled. Simultaneously, the fan which is an integral part of the drill bit rotates creating a suction pulling the debris and dust produced while drilling into the housing body and into the collection receptacle. In embodiments where a second fan is present within the center of the housing body, the second fan is secured on the additional shaft. The rotation of the second fan is powered in a manner as described above with the direction being downward into the collection receptacle.

Other objects, features and advantages of the present invention will be apparent when the detailed description of the preferred embodiments of the invention are considered with reference to the drawings, which should be construed in an illustrative and not limiting sense.

DETAILED DESCRIPTION OF THE INVENTION

In accordance with the present invention a drill attachment for collecting dust and debris is provided. As described in the accompanying drawings the structures of the invention device are labeled as follows:

1—Nozzle;
2—Filter;
3—Receptacle;
4—Handle;
5—Second Fan;
6—Means for attachment to Drill Chuck;
7—Nozzle Tip;
8—Front portion Housing Body (attached to Nozzle);
9—Opening from Housing Body into Receptacle;
10—Drill Attachment Device;
11—Locking Mechanism for Additional Shaft;
12—Back portion Housing Body;
13—Chamber within Nozzle;
14—Back portion Housing Body attached to Drill;
15—Chuck for Drill Bit;
20—Drill Bit;
25—Housing Body;
27—Nozzle Aperture;
30—Fan;
31—Fan Blade;
35—Additional Shaft;
40—Spring loaded mechanism (in Nozzle); and
51—Second Fan Blade.

Figure 1:
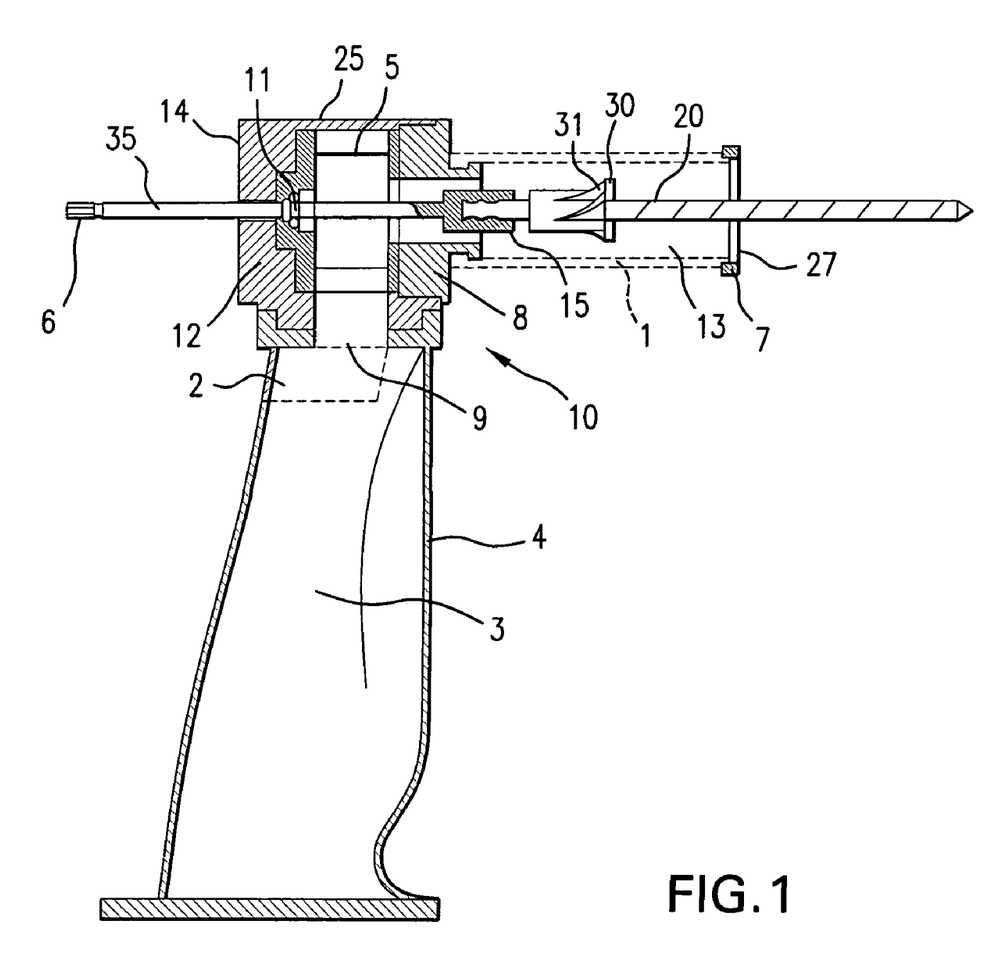
FIG. 1 is a cross section of the drill attachment illustrating the general features of the invention.

FIG. 1 is a cross section of the drill attachment illustrating the general features of the invention. The device 10 comprises a handle 4; a housing body 25 having a front 8 and back portion 12 and a top and bottom portion with the bottom portion being connected to the handle 4. The housing contains a hollow opening perpendicular to the handle running through the body. The handle of the device is a sturdy structure and is easily gripped by the user when the attachment is attached to a drill.

A nozzle 1 is connected to the front portion of the housing body. A drill bit 20 comprising a shaft including a fan 30 on the shaft having at least one blade 31 is contained within the hollow opening of the housing body.

At the tip of the nozzle 7 is an aperture 27 which is lined with a material to hold the attachment in place on a surface while drilling. The material is preferably a rubber material but any like material may be used in order to provide a snug fit to the drilling surface. The aperture opening is wide enough that during use suction is created by the rotation of the fan 30 to propel the dust and debris thru the housing body and to the receptacle. In preferred embodiments the aperture opening is adjusted according to the drill bit being used and the surface being drilled.

A receptacle 3 is provided to collect dust and debris from the housing body while the drill is in use. As shown in FIG. 1 the receptacle 3 is preferably within the handle 4 of the attachment. The handle/receptacle can be easily removed by the user to clean out the debris and dust therein.

An additional shaft 35 is located within the hollow opening of the housing body. One side of the additional shaft has a chuck for attaching and securing the drill bit 15 and the opposite side of the additional shaft has means for attachment to a drill 6. Preferably, the device further includes a locking mechanism 11 within the housing body to hold the additional shaft securely in place and mostly to prevent it from sliding forward or backward during use.

The drill bits used in the invention are interchangeable and depend on the surface being drilled. The chuck 15 for attachment of the drill bit can accommodate a variety of conventional drill bit sizes and shapes. The drill bits used in the invention correspond to conventional size and shape drill bits, but differ in the inclusion of an integral fan affixed to the drill bit shaft. The drill bit used depends on the surface to be drilled. Bits for drilling cement, plaster, metal and wood surfaces are included in the invention.

As shown in FIG. 1 the chuck 15 is situated near the front portion of the housing body connected to the nozzle. When the drill bit 20 is attached to the chuck the integral fan 30 is positioned near the chuck. The fan is preferably located in this position so as not to interfere with the penetration of the bit into the desired surface. This location is desirable because upon drilling the fan begins to rotate and creates a suction pulling the debris and dust thru the housing body and into the collection receptacle.

Figure 2:
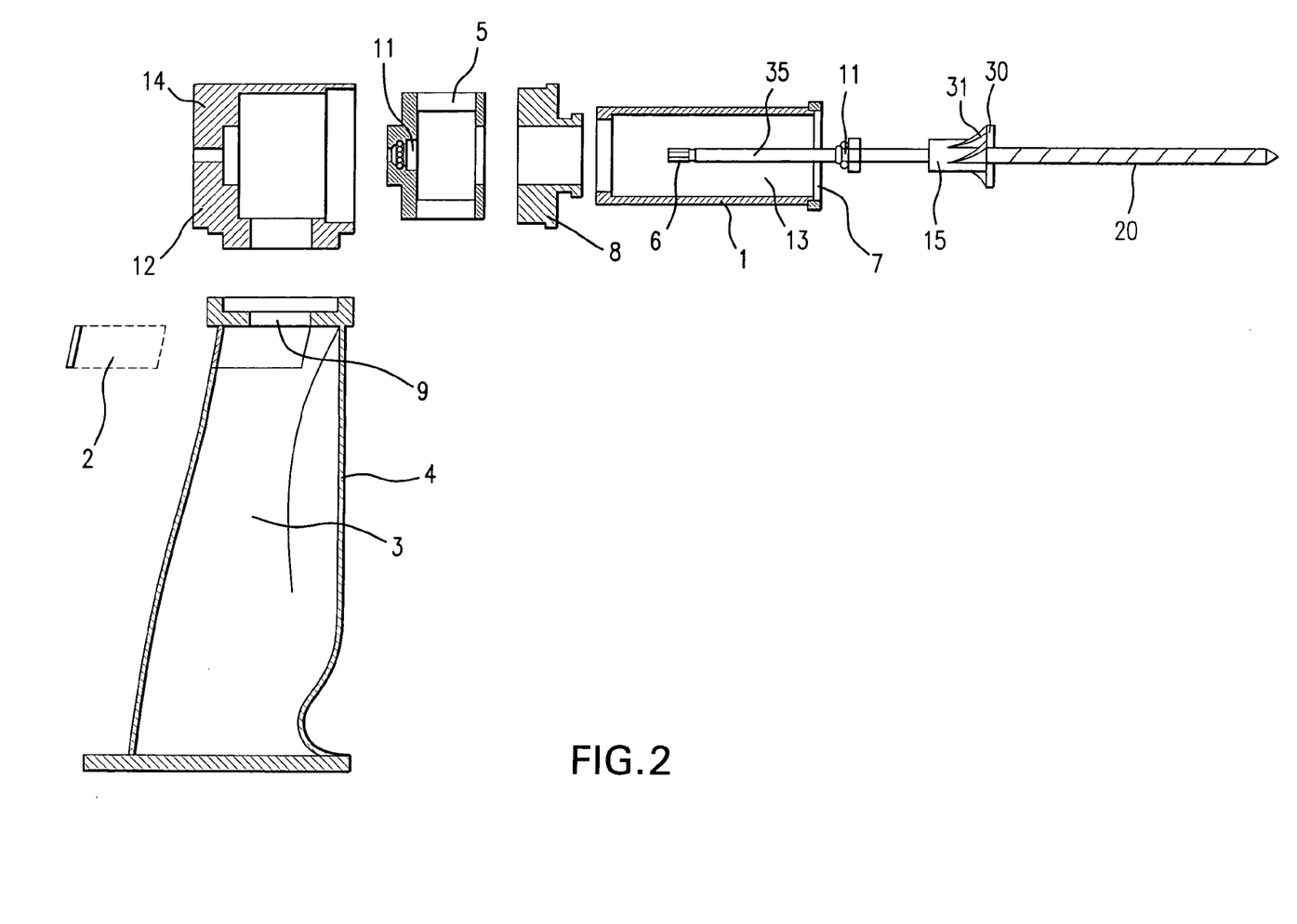
FIG. 2 is another cross section of the drill attachment according to the invention showing the component parts separated.

FIG. 2 is another cross-section of the drill attachment according to the invention showing the component parts separated. In a preferred embodiment, the housing body, handle, nozzle, receptacle and drill bit are easily separated from each other. In addition, the handle, housing body, nozzle and receptacle are made from a material selected from the group consisting of plastic, rubber, metal or similar materials.

The housing body can be a single integral unit 25 (shown in FIG. 1) or component pieces such as the back portion 12, surface attached to drill 14 and front portion 8. In an alternated embodiment the front portion 8 can be removed from the rest of the housing body in order to place the drill bit being used into the chuck 15. In the embodiment where the housing body is an integral unit, the nozzle is removed in order for the user to place the drill bit into the chuck 15.

The opening 9 at the bottom portion of the housing body connected to the handle permits the dust and debris collected to pass from the housing body to the receptacle. As shown a filter 2 can be included and covers the opening 9. This filter is easily removable for cleaning or replacement and is used for air flow and filtration.

Figure 3A:
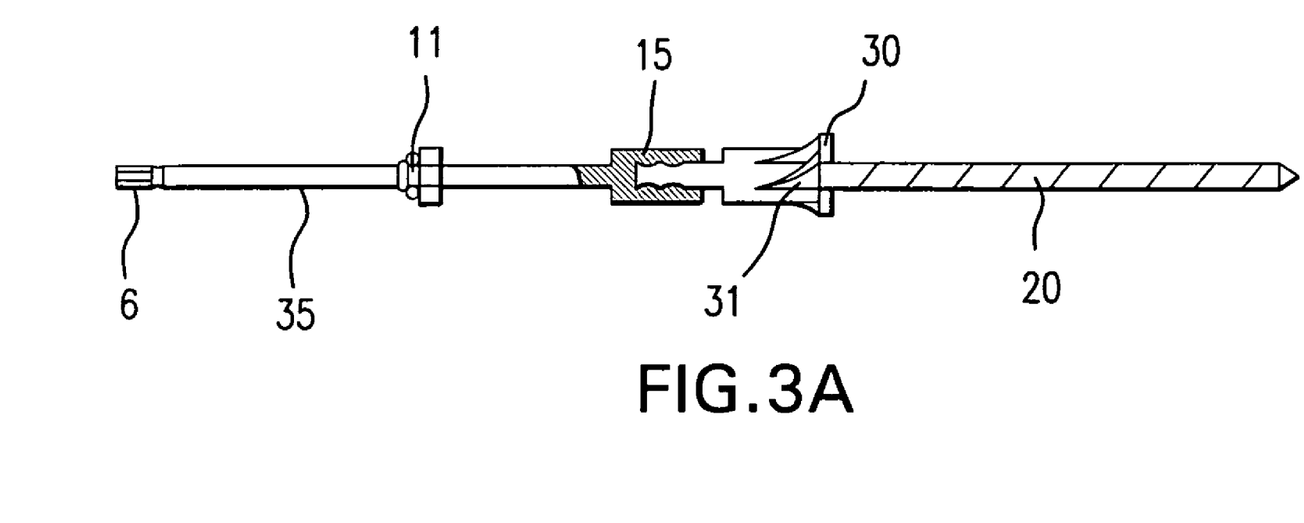
FIG. 3A illustrates component parts of the drill bit of the invention.
Figure 3B:
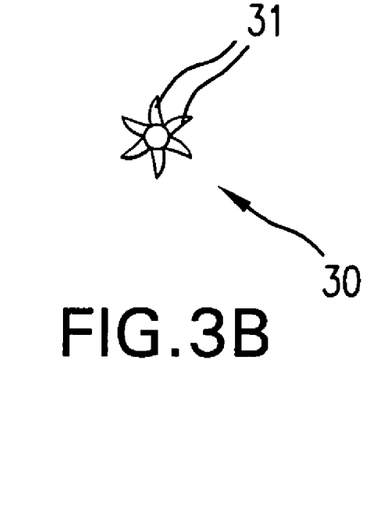
FIG. 3B illustrates a fan according to the invention.

FIG. 3A illustrates the component parts of the drill bit which is made of a shaft 20 including a fan 30 on the shaft having at least one blade 31. FIG. 3B illustrates a fan according to the invention having six blades. The fan blades are preferably made of metal but may be made of plastic, rubber or other like material.

Figure 4A:
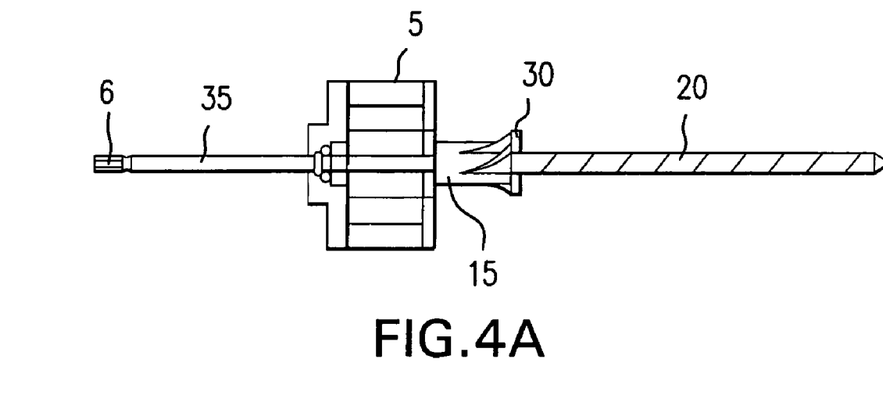
FIG. 4A is illustrates the drill bit according to the invention attached to a second fan.

In a preferred embodiment a second fan 5 is provided within the center portion of the housing body. FIG. 4A illustrates the placement of the second fan 5 in relation to the drill bit 20. The second fan is attached to the additional shaft 35 just in front of the locking mechanism 11 and behind the fan 30. The locking mechanism prevents the additional shaft from slipping back and forward while the device is being operated but does not interfere with the rotation of the shaft. In an alternated embodiment the additional shaft can be an integral part of the housing body without the need for the locking mechanism.

Figure 4B:
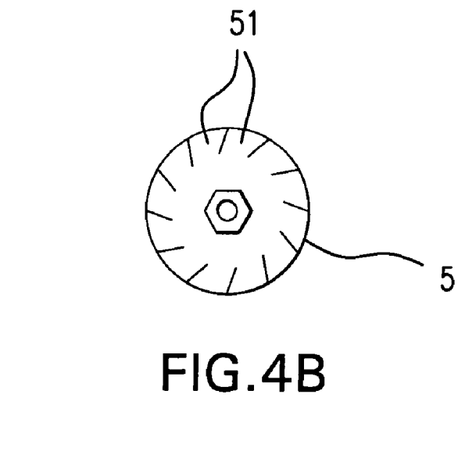
FIG. 4B illustrates the structure of the second fan.
Figure 4C:
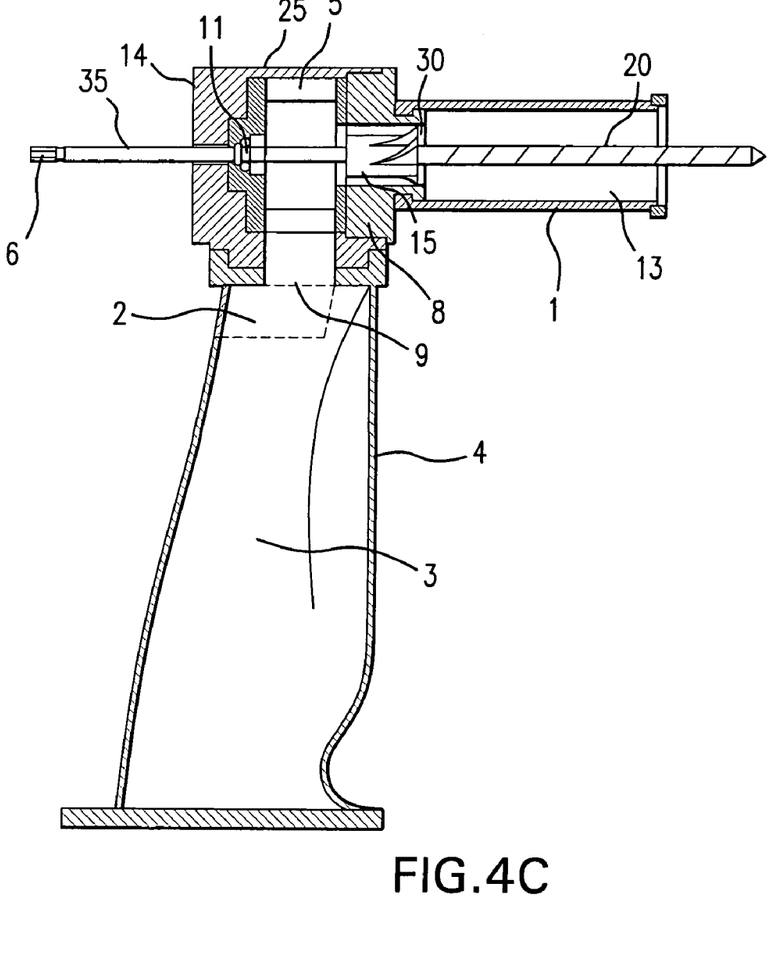
FIG. 4C is a cross section of the device showing these component parts.

FIG. 4B illustrates the general structure of the second fan which is preferably a wheel like structure differing from the blades of fan 30. The second fan blades are preferably channels or grooves 51 on a wheel-like structure, which when rotated direct the dust and debris in a downward direction into the collection receptacle 3 (shown in FIG. 4C).

Figure 5:
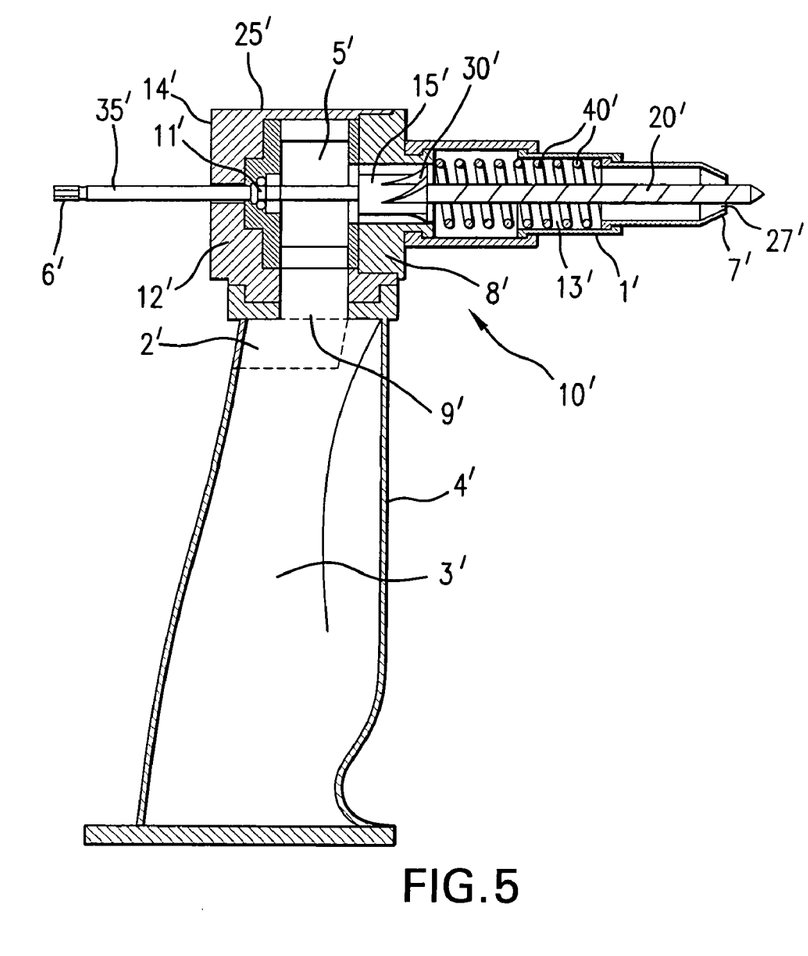
FIG. 5 is a cross section of another embodiment of the invention including a spring loaded nozzle.

The nozzle is preferably a collapsible enclosure around the drill bit and contains a chamber 13 for the flow of dust and debris to the receptacle. The nozzle expands and contracts as the drill bit is extended and contracted during use. It prevents the dust and debris from escaping when drilling. In an alternate embodiment, illustrated in FIG. 5 the nozzle includes a spring mechanism 40. In yet another embodiment the nozzle can have a telescoping design that is adjusted according to desired length which is determined by the drill bit being used and the surface being drilled.

The invention also provides a method for drilling and collecting dust and debris. A drill, preferably an electric drill is connected to the drill attachment according to the invention including a handle; a housing body having a front and back portion and a top and bottom portion, wherein the bottom portion is connected to the handle and the housing contains a hollow opening perpendicular to the handle running through the body; a nozzle which is connected to the front portion of the housing body; a drill bit comprising a shaft including a fan on said shaft having at least one blade within the hollow opening; and a receptacle to collect dust and debris. Although an electric drill is preferred, the invention attachment can be used with any type of drill.

Both the fan on the drill bit and the second fan are operated when the device is connected to a drill. When the drill is in use, the additional shaft is attached to the chuck of the drill, while the drill bit is secured to the chuck within the housing body on the opposite side of the additional shaft. Upon operation of the drill the entire additional shaft and attached drill bit rotates while penetrating the surface being drilled. Simultaneously, the fan which is an integral part of the drill bit rotates creating a suction pulling the debris and dust produced while drilling into the housing body and into the collection receptacle. In embodiments where a second fan is present within the center of the housing body, the second fan is secured on the additional shaft. The rotation of the second fan is powered in a manner as described above with the direction being downward into the collection receptacle.

Figure 6:
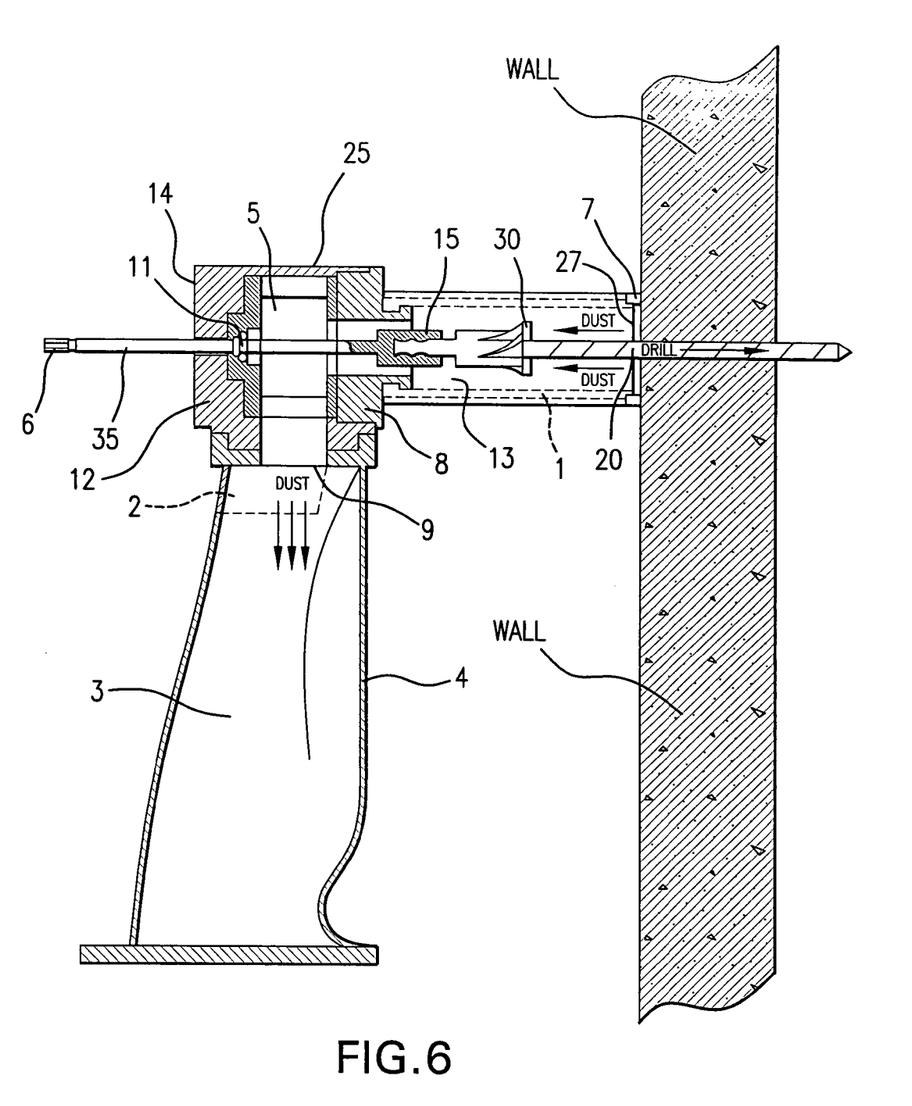
FIG. 6 is a schematic illustration of the drill bit according to the invention penetrating a wall surface and showing the direction of dust and debris upon drilling

FIG. 6 is a schematic illustration of the showing the direction of the dust and debris as the drill bit of the invention penetrates a wall surface. As the drill bit 20 penetrates the wall surface the dust and the debris created is directed from the aperture 27 into the nozzle chamber 13 by the suction created from the fan 30 on the drill bit 20. The debris and dust is directed into the housing body 25 which is in turn directed in a downward direction by the second fan 5 into the collection receptacle 3.

The invention also provides a drill bit made of a shaft including a fan on the shaft having at least one blade. The size and shape of the drill bit corresponds to conventional drill bits for drilling cement, wood, plaster and metal surfaces. In the preferred embodiment the invention drill bit includes an integral fan which is part of the entire structure. In an alternate embodiment, the fan on the drill bit can be removed, however, when the bit is in use it is secured on the drill bit shaft. This embodiment essentially can convert conventional drill bits to a drill bit according to the invention and for use in the drill attachment device.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A drill attachment for dust and debris collection comprising:
    a handle;
    a housing body having a front and back portion and a top and bottom portion, wherein said bottom portion is connected to said handle and said housing body contains a hollow opening perpendicular to said handle running through said body;
    a nozzle which is connected to said front portion of the housing body;
    a drill bit comprising a shaft including a fan on said shaft having at least one blade within said hollow opening;
    an additional shaft within said hollow opening wherein one side of said additional shaft has a chuck for securing said drill bit and the opposite side of said additional shaft has means for attachment to a drill; and
    a receptacle to collect dust and debris while the drill is in use.

2. The drill attachment according to claim 1, wherein said receptacle is within said handle of the attachment.

3. The drill attachment according to claim 1, further comprising an opening at the bottom portion of said housing body.

4. The drill attachment according to claim 3, further comprising a filter covering said opening.

5. The drill attachment according to claim 1, further comprising a locking mechanism within said housing body to hold said additional shaft in place.

6. The drill attachment according to claim 1, wherein said fan on said drill bit is situated in the front portion of said housing body connected to said nozzle.

7. The drill attachment according to claim 1, wherein said nozzle has a tip which is an aperture.

8. The drill attachment according to claim 7, wherein the outer surface of said aperture is lined with a material to hold the attachment in place on a surface.

9. The drill attachment according to claim 1, wherein said nozzle expands and contracts.

10. The drill attachment according to claim 9, further comprising a spring mechanism within said nozzle.

11. The drill attachment according to claim 1, wherein said housing body further includes a removable access piece on the front portion adjacent to said nozzle.

12. The drill attachment according to claim 1, wherein said fan has six blades.

13. The drill attachment according to claim 1, further comprising a second fan within the center portion of said housing body.

14. The drill attachment according to claim 1, wherein said housing body, handle, nozzle, receptacle and drill bit are easily separated from one another.

15. The drill attachment according to claim 1, wherein said housing body, handle, nozzle and receptacle is made from a material selected from the group consisting of plastic, rubber, metal or similar materials.

16. The drill attachment according to claim 1, wherein said drill bit is interchangeable.

17. A method for drilling and collecting dust and debris comprising:
    attaching a drill attachment comprising a handle; a housing body having a front and back portion and a top and bottom portion, wherein said bottom portion is connected to said handle and said housing body contains a hollow opening perpendicular to said handle running through said body; a nozzle which is connected to said front portion of said housing body; a drill bit comprising a shaft including a fan on said shaft having at least one blade within said hollow opening; a receptacle to collect dust and debris; and a second fan within the center portion of said housing body; to a drill at the back portion of said housing body;
    placing the nozzle of the housing body on the surface to be drilled;
    drilling, wherein the drill bit penetrates the surface and the dust and debris produced is directed by said fan and said second fan into said receptacle.

18. The method according to claim 17, further comprising an additional shaft within said hollow opening wherein one side of said additional shaft has a chuck for securing said drill bit and the opposite side of said additional shaft has means for attachment to a drill.

* * * * *